United States Patent
Krishnamurthy et al.

(10) Patent No.: US 12,211,001 B2
(45) Date of Patent: Jan. 28, 2025

(54) CONTAINER LOAD PERFORMANCE METRIC AGGREGATION

(71) Applicant: ZEBRA TECHNOLOGIES CORPORATION, Lincolnshire, IL (US)

(72) Inventors: Adithya H. Krishnamurthy, Hicksville, NY (US); Miroslav Trajkovic, Setauket, NY (US); Justin F. Barish, Kings Park, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 685 days.

(21) Appl. No.: 17/491,374

(22) Filed: Sep. 30, 2021

(65) Prior Publication Data
US 2023/0112116 A1    Apr. 13, 2023

(51) Int. Cl.
*B65G 67/20*    (2006.01)
*G05B 19/418*    (2006.01)
*G06Q 10/087*    (2023.01)
*B65G 69/28*    (2006.01)

(52) U.S. Cl.
CPC ..... *G06Q 10/087* (2013.01); *G05B 19/41865* (2013.01); *B65G 69/28* (2013.01); *G05B 2219/32392* (2013.01)

(58) Field of Classification Search
CPC ............ G06Q 10/087; G05B 19/41865; G05B 2219/32392; B65G 67/20
See application file for complete search history.

(56) References Cited

U.S. PATENT DOCUMENTS

| | | | |
|---|---|---|---|
| 9,280,756 B2 * | 3/2016 | Hara | G06Q 10/087 |
| 9,382,068 B1 * | 7/2016 | Quan | G06Q 10/083 |
| 9,733,638 B2 * | 8/2017 | Ziegler | G06Q 10/087 |
| 9,792,577 B2 * | 10/2017 | Mountz | B65G 1/1378 |
| 11,946,796 B2 * | 4/2024 | Silk | G01G 3/147 |

(Continued)

FOREIGN PATENT DOCUMENTS

CN    115981778 A  *  4/2023

OTHER PUBLICATIONS

International Search Report and Written Opinion for International Application No. PCT/US2022/42987 mailed on Jan. 3, 2023.

*Primary Examiner* — Patrick H Mackey (57) ABSTRACT

An example method includes: during a container load process, controlling a sensor assembly to capture sensor data depicting a container interior; detecting, from the sensor data, items in the container interior; determining, based on the detected items, first and second load process metrics associated with first and second targets; generating first and second normalized metrics based on the first and second load process metrics, and the first and second targets; obtaining a first weighting factor associated with the first load process metric, and a second weighting factor associated with the second load process metric; combining the first normalized metric and the first weighting factor, with the second normalized metric and the second weighting factor, to generate an aggregated load process metric; and transmitting a control command according to the aggregated load process metric; and rendering, at an indicator device, a load process state indicator according to the control command.

17 Claims, 7 Drawing Sheets

(56) References Cited

U.S. PATENT DOCUMENTS

| | | |
|---|---|---|
| 2007/0075853 A1 | 4/2007 | Griffin et al. |
| 2007/0261894 A1 | 11/2007 | Harish |
| 2008/0025565 A1 | 1/2008 | Zhang et al. |
| 2020/0097662 A1 | 3/2020 | Hufsmith et al. |
| 2021/0125363 A1 | 4/2021 | Barish |
| 2022/0289493 A1* | 9/2022 | Chien .................. B65G 1/0407 |
| 2023/0044858 A1* | 2/2023 | Barish ..................... G06F 30/10 |
| 2023/0112116 A1* | 4/2023 | Krishnamurthy ...... B65G 67/20 |
| | | 700/213 |
| 2023/0245015 A1* | 8/2023 | Sardar ................... G06Q 10/08 |
| | | 705/50 |
| 2023/0356966 A1* | 11/2023 | Narendra ............... B65G 67/04 |
| 2024/0071046 A1* | 2/2024 | Romero ................. G06V 10/82 |

* cited by examiner

CONTAINER LOAD PERFORMANCE METRIC AGGREGATION

BACKGROUND

Material handling facilities, such as warehouses, airports and the like, can deploy sensor systems to monitor various metrics for container load processes. The proliferation of available metrics from such systems, however, may complicate the use of the metrics to control system operations and/or assess performance.

SUMMARY

In an embodiment, the present invention is a method for load performance metric aggregation, including: (a) during a load process for a container at a load bay, controlling a sensor assembly disposed at the load bay to capture sensor data depicting an interior of the container; (b) at a computing device communicatively coupled to the sensor assembly: detecting, from the sensor data, a plurality of items placed in the container interior; determining, based on the detected plurality of items, a first load process metric associated with a first target, and a second load process metric associated with a second target; generating a first normalized metric based on the first load process metric and the first target, and a second normalized metric based on the second load process metric and the second target obtaining a first weighting factor associated with the first load process metric, and a second weighting factor associated with the second load process metric; combining (i) the first normalized metric and the first weighting factor, with (ii) the second normalized metric and the second weighting factor, to generate an aggregated load process metric; and transmitting a control command according to the aggregated load process metric; and (c) rendering, at an indicator device associated with the load bay, a load process state indicator according to the control command.

In another embodiment, the present invention is a computing device for load performance metric aggregation, comprising: a communications interface communicatively coupling the computing device with an indicator device; and a processor configured to: during a load process for a container at a load bay, control a sensor assembly disposed at the load bay to capture sensor data depicting an interior of the container; detect, based on the sensor data, a plurality of items placed in the container interior; determine, based on the detected plurality of items, a first load process metric associated with a first target, and a second load process metric associated with a second target; generate a first normalized metric based on the first load process metric and the first target, and a second normalized metric based on the second load process metric and the second target obtain a first weighting factor associated with the first load process metric, and a second weighting factor associated with the second load process metric; combine (i) the first normalized metric and the first weighting factor, with (ii) the second normalized metric and the second weighting factor, to generate an aggregated load process metric; and transmit a control command according to the aggregated load process metric.

In a further embodiment, the present invention is a non-transitory computer readable medium storing instructions executable by a processor of a computing device to: during a load process for a container at a load bay, control a sensor assembly disposed at the load bay to capture sensor data depicting an interior of the container; detect, based on the sensor data, a plurality of items placed in the container interior; determine, based on the detected plurality of items, a first load process metric associated with a first target, and a second load process metric associated with a second target; generate a first normalized metric based on the first load process metric and the first target, and a second normalized metric based on the second load process metric and the second target obtain a first weighting factor associated with the first load process metric, and a second weighting factor associated with the second load process metric; combine (i) the first normalized metric and the first weighting factor, with (ii) the second normalized metric and the second weighting factor, to generate an aggregated load process metric; and transmit a control command according to the aggregated load process metric.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Figure 1:
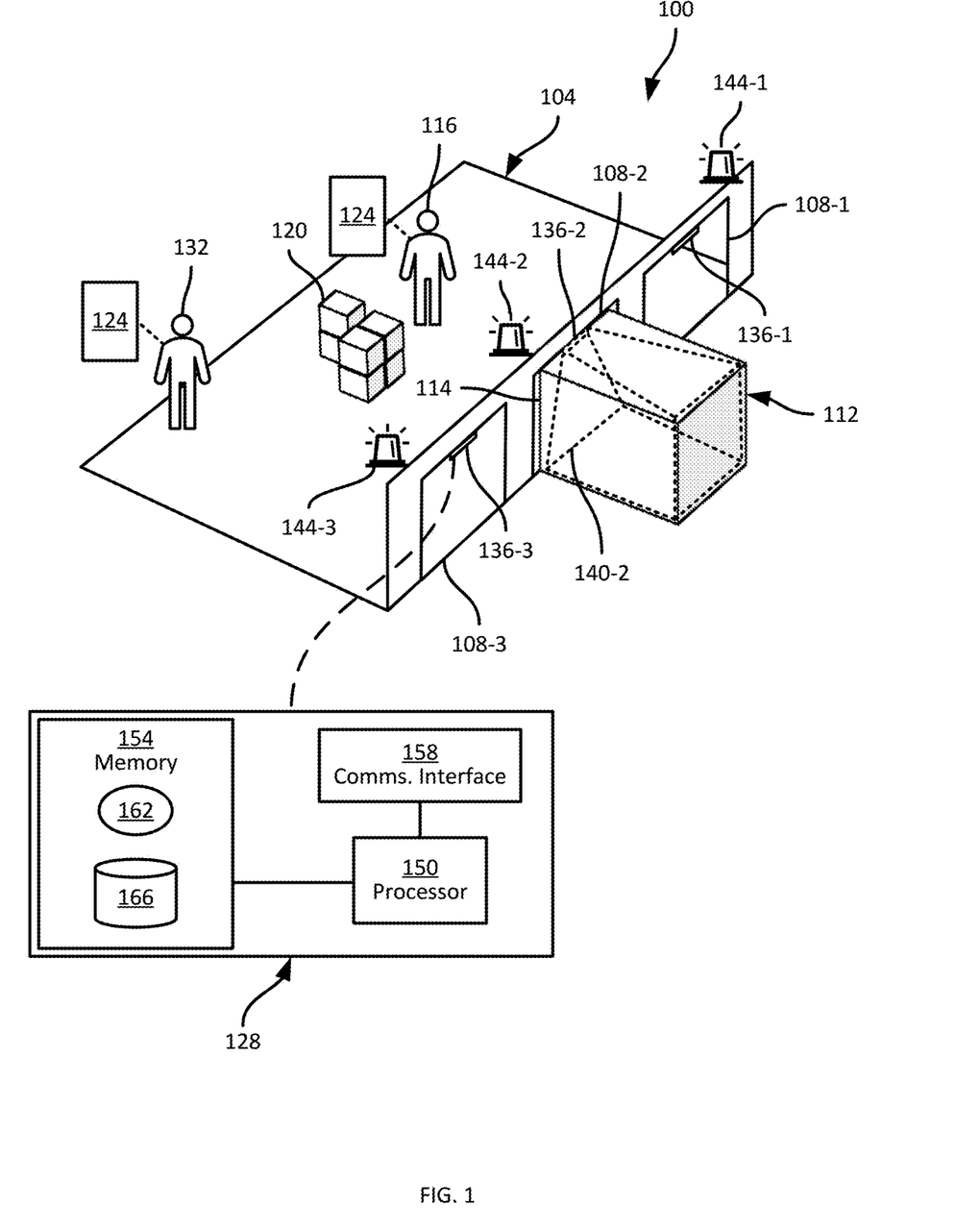
FIG. 1 is a diagram of a system for container load process metric aggregation.

FIG. 1 depicts a container loading and unloading system 100, including a facility 104 (e.g., a warehouse, manufacturing facility, retail facility, transit facility such as an airport, or the like) with at least one load bay 108. As illustrated, the facility 104 includes a portion of a building, such as a cross dock or portion thereof, including load bays 108. In the illustrated example, three load bays 108-1, 108-2, and 108-3 are shown. The load bays 108 may, for example, be arranged along an outer wall of the facility 104, such that containers can approach the load bays 108 from the exterior of the facility 104. In other examples, smaller or greater numbers of load bays 108 may be included. Further, although a single facility 104 is illustrated in FIG. 1, in some examples, the load bays 108 may be distributed across multiple physically distinct facilities. The load bays 108 are illustrated as being dock structures enabling access from within the facility 104 to an exterior of the facility 104 where a container 112 is placed. In other examples, one or more of the load bays 108 may be implemented as a load station within the facility 104, to load or unload containers that are handled inside the facility 104.

Each load bay 108 is configured to accommodate a container, such as the example container 112 shown in FIG. 1. In particular, the container 112 is shown at the load bay 108-2. The container 112 can be any container transportable by at least one of a vehicle, a train, a marine vessel, an airplane or the like, and configured to store transportable goods such as boxed and/or unboxed items and/or other types of freight. The container 112 may therefore be, for example, a semi-trailer including an enclosed box affixed to a platform including one or more sets of wheels and a hitch assembly for towing by a powered vehicle. In further examples, the container 112 may be the box portion of a box truck in which the container 112 is affixed to the body of the vehicle which also supports a cab, powertrain, and the like. In other examples, the container 112 can be a unit loading device (ULD) of the type employed to load luggage, freight and the like into aircraft. In such examples, the container 112 may be transported to and from load bays 108 by a vehicle such as a pallet truck or the like. In still further examples, a ULD is processed at a load bay 108 located within the facility 104 as noted above, rather than at a load bay 108 allowing access to the facility exterior.

Each load bay 108 includes an opening, e.g., in a wall of the facility 104, that enables staff and/or equipment within the facility 104 to access an interior of the container 112. For example, once the container 112 is placed at the load bay 108-2 as shown in FIG. 1, e.g., with an open end 114 of the container (e.g., a wall with a door or other opening allowing access to an interior of the container 112) substantially flush with the opening of the load bay 108-2, a worker 116 within the facility 104 can begin moving items 120 from the facility 104 into the container 112. For a loading process, when the container 112 has been filled to a target level, a door of the container 112 can be closed, and the container 112 can be withdrawn from the load bay 108-2 to make way for another container. As will now be apparent, a similar process may be implemented to unload the container 112, e.g., by the worker 116, to take delivery of items at the facility 104 for further processing. Loading and unloading processes are referred to collectively herein as "load" processes.

The facility 104 may include a significant number of load bays 108 (e.g., some facilities may include hundreds of load bays 108), as well as a significant number of workers such as the worker 116. The size, weight, and/or handling requirements of the items 120 may vary from container to container. Further, performance targets may be applied to each load process, including the time available to fill a given container 112, the degree to which each container 112 is expected to be filled, and the like. Such constraints may also vary between load processes.

The worker 116 may carry or otherwise operate a client computing device 124, such as a wearable computer, a tablet computer, a smartphone, or the like. The device 124 may receive messages, e.g. from a server 128, containing instructions for the worker 116. The instructions may identify which items 120 are to be loaded into the current container 112, as well as the time available to load the container 112, the degree to which the container 112 is expected to be filled, and the like. The computing device 124 may also be mounted to a wall, suspended from the ceiling by a retention system, or other fixed portion of the facility 104 at or near the load bay 108-2. Each load bay 108 may include a device 124.

One or more supervisors 132 may therefore also be deployed throughout the facility 104, e.g. equipped with corresponding client devices 124. The supervisor 132 may be responsible for allocating resources, such as workers 116, to the three load bays 108 shown in FIG. 1. To assist in the allocation of resources to load bays 108, the system 100 can include respective sensor assemblies 136-1, 136-2, and 136-3 disposed at the load bays 108-1, 108-2, and 108-3. Each sensor assembly 136 includes at least one image and/or depth sensor. For example, each sensor assembly 136 can include an RGB camera and a depth camera. In other examples, the sensor assemblies 136 can include lidar sensors, ultrasound sensors, trip detectors, sonar devices, or the like, in addition to or instead of the above-mentioned cameras. Each sensor assembly 136 is positioned at the corresponding load bay 108 such that a field of view (FOV) 140 (the FOV 140-2 of the sensor assembly 136-2 is shown in FIG. 1) is aimed outwards from the load bay 108, into the interior of the container 112 docked at that load bay 108. In some examples, the sensor assembly 136 may be affixed to the container 112 itself, or the sensor assembly 136 can encompass sensors affixed within the container 112 as well as sensors affixed to the load bay 108.

The sensor assemblies 136 are therefore controllable, e.g. by the server 128, to capture sensor data such as images and/or point clouds corresponding to the interior of docked containers 112. The server 128, in turn, is configured to process the sensor data to detect items 120 therein, and generate various load process metrics, which may be updated periodically during a load process (e.g., by capturing and processing additional sensor data). In some examples, the sensor assemblies 136 themselves can include processing hardware and software to determine load process metrics for subsequent use by the server 128.

An example load process metric includes a fullness level, representing a proportion of an internal volume of the container 112 that has been filled with the items 120. Another example load process metric includes a wall grade metric, which indicates the proportion of a wall of items 120 in the container 112 that is empty space (e.g., gaps between the items 120). A further example load process metric is an elapsed time for the load process. In some examples, the elapsed time can be subdivided into load time and idle time, with the latter indicating the amount of time during the load process for which no load activity was detected in the container by the sensor assembly 136. Further examples of load process metrics include attributes of walls of items 120, such as wall height and wall depth.

Any one or more of the above load process metrics may also be associated with targets, e.g., values that the corresponding metrics are expected to reach over the course of the load process. For example, a given load process may have target fullness of 90% (meaning that 90% of the container volume is expected to be filled), and a target load time of four hours (meaning that the load process is expected to be complete, and the container 112 ready for departure from the load bay 108, four hours after arrival of the container 112 at the load bay 108).

The load process metrics and targets can be used to assess the performance of a given load process, either substantially in real-time during the load process, or after completion of the load process, e.g. for planning purposes for future load processes, or both. For example, during a load process, status indicators or other information can be provided to the client devices 124, and/or to other indicator devices 144-1, 144-2, 144-3 associated with the load bays 108 (e.g., light emitting diodes (LEDs) or the like). The indicator lights 144 can be controlled, for example, to provide feedback on current performance, e.g. by color-coded signals.

Assessing the performance of a load process substantially in real-time, and assessing historical records of load processes for planning purposes, may be complicated by the wide variety of available load process metrics. For example, a load process may show that a fullness target was reached, or is on track to be reached, but that a target load time was or is likely to be exceeded. Determining whether to initiate control actions, e.g. to alert the worker 116 and/or the supervisor 132 via the client devices 124 and/or activate the indicator lights 144, or evaluating which load processes were or were not successful from historical data, may involve determining which of the above factors is more or less important than the other. Such determinations may become more complex with additional load process metrics. Such performance assessments may therefore involve deploying facility-specific logic such as decision trees and the like, e.g., at the server 128. Such control logic may be complex, error-prone, and time-consuming to deploy. In addition, the introduction of additional load process metrics may require substantial revisions to such logic, further increasing deployment costs and/or downtime.

The server 128 is therefore configured, in the examples discussed herein, to provide a configurable mechanism for generating an aggregated load process metric from an arbitrary set of the above-mentioned load process metrics. Thus, the above-mentioned decision trees or other logic can be replaced with computationally simpler evaluations of a single value (i.e. the aggregated load process metric), and that single value can also be employed to more efficiently compare load performance from completed load processes.

The server 128 includes a central processing unit (CPU), also referred to as a processor 150, interconnected with a non-transitory computer readable storage medium, such as a memory 154. The memory 154 includes any suitable combination of volatile memory (e.g. Random Access Memory (RAM)) and non-volatile memory (e.g. read only memory (ROM), Electrically Erasable Programmable Read Only Memory (EEPROM), or flash). The processor 150 and the memory 154 each comprise one or more integrated circuits (ICs).

The server 128 also includes a communications interface 158, enabling the server 128 to exchange data with other computing devices, such as the client devices 124 and/or the sensor assemblies 136. The communications interface 158 therefore includes any suitable hardware (e.g. transmitters, receivers, network interface controllers and the like) allowing the server 128 to communicate, e.g. over local and/or wide area networks.

The memory 154 stores a plurality of computer-readable instructions, e.g. in the form of a load assessment application 162. The application 162 is executable by the processor 150 to implement various functionality performed by the server 128. As will be discussed below, the application 162 implements the metric aggregation function mentioned above. The memory 154 also stores configuration parameters for the metric aggregation function, e.g., in a repository 166.

Figure 2:
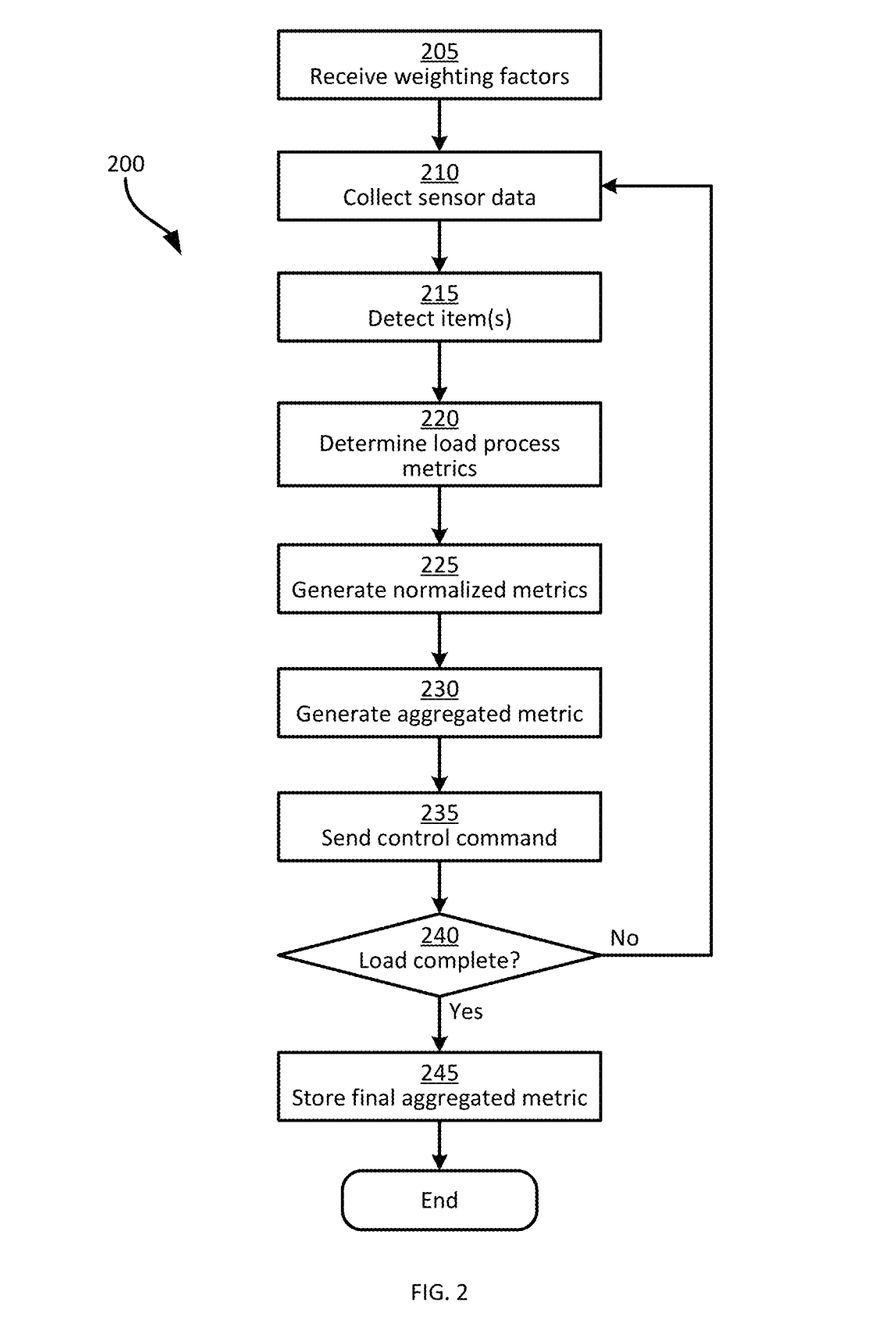
FIG. 2 is a flowchart of a method of container load process metric aggregation.

Turning to FIG. 2, a method 200 of aggregating load process metrics is shown. The method 200 will be described in conjunction with an example performance of the method 200 within the system 100. In particular, the blocks of the method 200 are performed by the server 128 in this example, as configured via execution of the application 162.

At block 205, the server 128 is configured to receive weighting factors to be used in the aggregation process. The weighting factors can be received from a client device 124, and/or from an input device connected directly to the server 128. Each weighting factor corresponds to a particular load process metric, and represents the relative importance of that load process metric in the aggregated load process metric. Each weighting factor is therefore a value between zero and one, in the present example, although other ranges for weighting factors may be employed in other examples.

Figure 3:
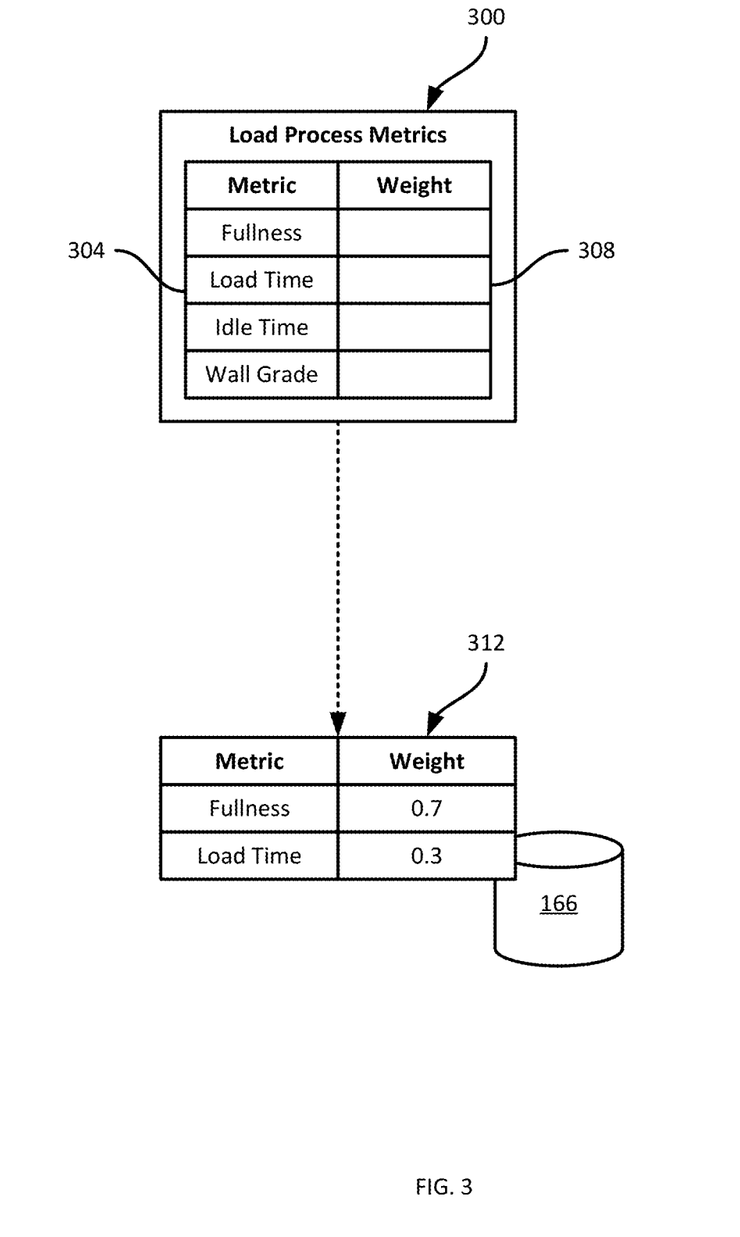
FIG. 3 is a diagram illustrating an example performance of block 205 of the method of FIG. 2.

For example, turning to FIG. 3, the server 128 can present a configuration interface 300 at a client device 124 or another suitable device with an input/output assembly (e.g. a display and a keyboard, keypad or the like). The configuration interface 300 includes a set of load process metric identifiers 304, representing the load process metrics available in the system 100. The set of load process metrics can be generated, e.g., by detecting which processing modules are installed on the server 128 or another computing device in the system 100. Thus, the list of available load process metrics presented in the interface 300 may vary between deployments of the system 100.

The interface 300 also includes, for each load process metric, a field 308 or other prompt for receiving input data defining a weighting factor for the corresponding metric. An operator can therefore specify, for a selected subset of the load process metrics (up to and including all available load process metrics), a weighting factor that will determine the impact of the corresponding metric on the aggregated metric mentioned above. In general, a larger weighting factor translates to a larger impact, and vice versa. As noted above, the weighting factors can be values between zero and one, and the server 128 may impose a requirement that the weighting factors entered in the interface 300 sum to a value of one.

Upon receipt of input data via the interface 300, the input data can be stored in the repository, for example in the form of a weighting factors record 312 containing the weighting factors received via the interface 300, and identifying which load process metrics correspond to the received weighting factors. As seen in FIG. 3, weighting factors may be received for only some of the available process metrics (in the illustrated example, container fullness and load time). As will now be apparent, the set of load process metrics contributing to the aggregated load process metric can be readily updated via the interface 300 at a later time, in addition to being set initially at the time of deployment of the system 100.

As shown in FIG. 3, the fullness metric has been assigned a weight of 0.7, while the time metric has been assigned a weight of 0.3. A wide variety of other weighting factors can be assigned, depending on the nature of the facility 104 and the items 120 handled therein. For example, facilities with higher volumes of containers 112 to process may place greater weight on time-based metrics, while facilities with lower container volumes may place greater weight on fullness or other related metrics.

Returning to FIG. 2, at block 210 in response to initiation of a load process, the server 128 is configured to obtain sensor data. For example, the server 128 can be configured to control the sensor assembly 136-2 to capture sensor data depicting the interior of the container 112. The sensor data can include, as noted earlier, an image depicting the interior of the container 112, a point cloud depicting the interior of the container 112, or both an image and a point cloud.

At block 215, based on the sensor data, the server 128 is configured to identify items 120 in the container 112. For example, the server 128 can be configured to identify sets of items forming walls in the container 112. The identification of a set of items can be performed, in some examples, by fitting one or more planar surfaces to the sensor data, or other suitable object detection mechanisms. In the present example, the server 128 can be configured to determine whether a substantially vertical surface can be fit to the sensor data, between the far wall of the container 112 (i.e. the wall opposite the open end 114) and the open end 114. Such a surface likely indicates the presence of a set of items 120 having been placed in the container 112.

At block 220, the server 128 is configured to determine, from the results of block 215, at least a first load process metric and a second load process metric. As will be apparent from FIG. 3 and the discussion above, the server 128 can determine more than two load process metrics in some examples. In the example below, in keeping with the selection of weighting factors for container fullness and load time as shown in FIG. 3, it will be assumed in the discussion below that fullness and load time are the first and second load process metrics determined at block 220. The specific mechanisms by which the load process metrics are determined are outside the scope of the present discussion, and a variety of ways of computing load process metrics will occur to those skilled in the art. In general, load process metrics are determined by detecting attributes of the items sets detected at block 215 (e.g. the height, width and depth of a wall of items 120), and in some cases by comparing those attributes to attributes of the container 112 itself.

Figure 4:
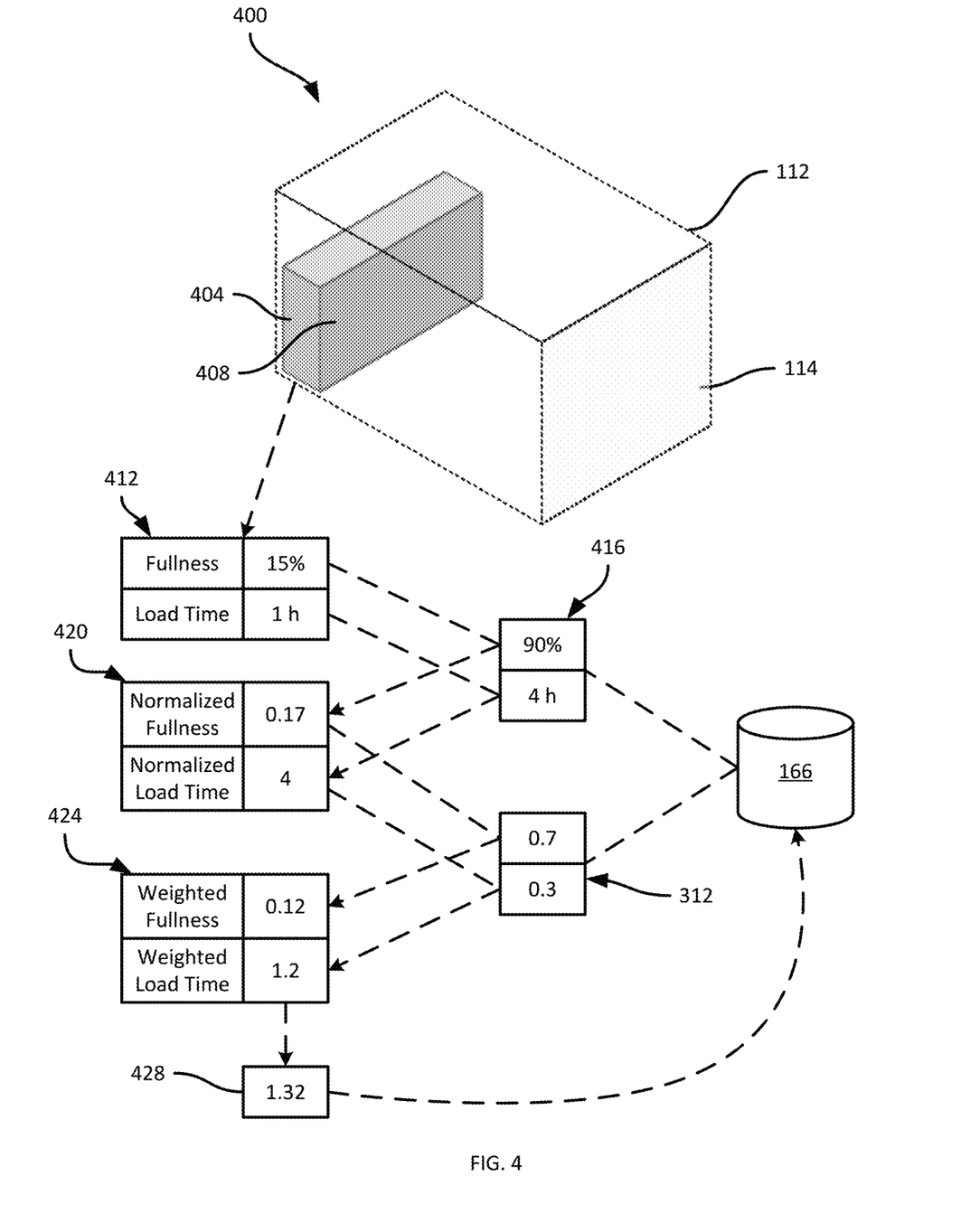
FIG. 4 is a diagram illustrating an example performance of blocks 215 to 230 of the method of FIG. 2.

Turning to FIG. 4, example sensor data 400 is illustrated, with the container 112 shown in dashed lines. The sensor data 400 indicates the presence of a set 404 of items within the container 112, e.g. at a rear wall thereof (opposite the open end 114). Depending on the nature of the sensor data 400 and the positioning of the sensor assembly 136, only a forward surface 408 of the set 304 may be shown in the sensor data, or both the forward surface and a top surface of the set 304 may be visible. The server 128 can be configured, for example, to detect the set 404 by fitting a planar surface to the forward surface 408 of the set 404. The server 128 is configured to determine load process metrics 412 at block 220. For instance, based on the dimensions and/or position of the planar surface or other attributes of set 404 detected by the server, a fullness metric is determined. The fullness metric represents a proportion of the interior volume of the container 112 that is occupied by items 120. In the present example, the fullness determined at block 220 is shown as 15%. In addition, at block 220 the server 128 determines a current load time of one hour, representing the time elapsed since loading of the container 112 began. As will be apparent, the load time need not be determined from the sensor data 400 representing the items 120, but can instead be determined from an internal clock at the sensor assembly 136 and/or server 128.

Although only fullness and load time metrics are illustrated in FIG. 4, the server 128 can also determine other load process metrics, even if such metrics are not employed in the generation of an aggregated load process metric as discussed herein.

At block 225, the server 128 is configured to generate, from the load process metrics determined at block 220, normalized load process metrics. Specifically, at block 225 the load process metrics 412 are normalized relative to the above-mentioned targets. Targets 416 can be retrieved from the repository 166, e.g., having been stored in the repository 166 prior to initiation of the load process. The targets 416 indicate, as mentioned earlier, a target fullness of 90% and a target load time (i.e. a time within which the container 112 is expected to reach the target fullness and be prepared for removal from the load bay 108) of four hours.

Generating normalized load process metrics 420 includes, in the illustrated example, determining a ratio of the fullness metric to the fullness target, and a ratio of the load time target to the load time metric. Thus, in the illustrated example, the normalized fullness is 0.17, and the normalized load time is 4.

Referring again to FIG. 2, at block 230, the server 128 is configured to combine the normalized metrics with the weighting factors, to generate an aggregated load process metric. In particular, each normalized metric is modified according to the corresponding weighting factor, and the resulting modified metrics (also referred to as weighted metrics) are combined to generate the aggregated metric. Returning to FIG. 4, the weighting factors 312 are shown as being retrieved from the repository 166 and applied to the normalized load process metrics 420 to produce weighted metrics 424. The weighted metrics 424, in turn, are combined (e.g., added together) to produce an aggregated load process metric 428. In other words, two or more load process metrics can be employed by the server 128 to produce a single aggregated metric. The aggregated metric 428 can also be stored in the repository 166.

Referring again to FIG. 2, at block 235 the server 128 can be configured to generate and transmit one or more control commands, e.g. to the client device(s) 124 and/or the indicator devices 144, according to the aggregated load process metric. In some examples, the server 128 can send a message containing the aggregated metric itself to the client devices 124, e.g. for display to the worker 116, the supervisor 132, or the like. In further examples, the server 128 can generate the control command by comparing the aggregated metric 428 to one or more thresholds. For example, the control command can indicate whether the aggregated metric 428 is above or below one or more thresholds.

Figure 5:
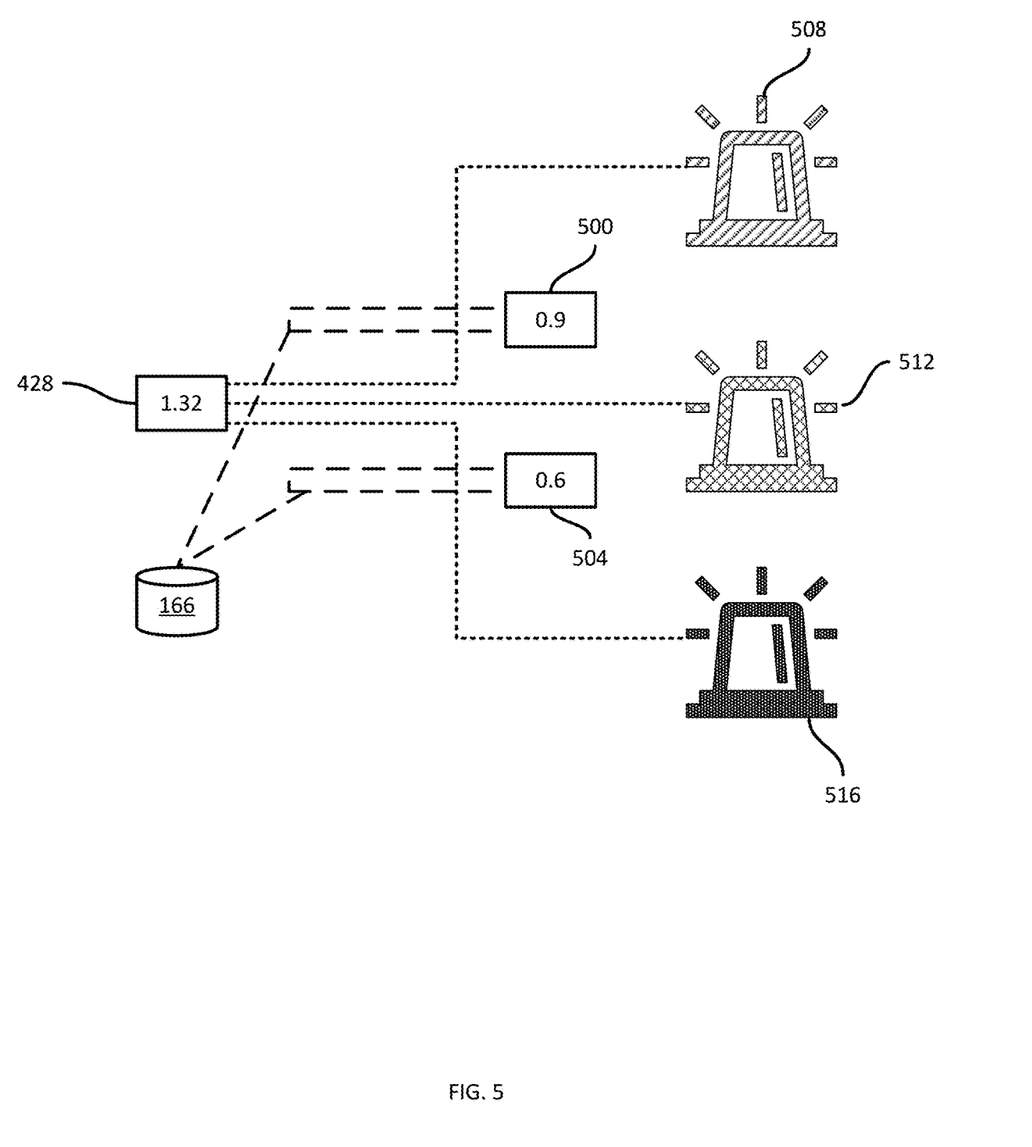
FIG. 5 is a diagram illustrating an example performance of block 235 of the method of FIG. 2.

Referring to FIG. 5, an example process for the generation of a control command is illustrated. For example, the server 128 can retrieve an upper threshold 500 and a lower threshold 504 from the repository 166, and compare the aggregated metric 428 to the thresholds 500 and 504. The server 128 can also store predefined load process state indicators in association with the thresholds. In the present example, the load process state indicators can include a set of visual indicators 508, 512, and 516 indicating respective performance levels for the load process. The visual indicators can include colors and/or patterns (e.g. flashing or the like) for light emitted by the indicator devices 144, audio sequences for reproduction by the indicator devices 144, or the like. For example, the indicator 508 can be employed for an aggregated metric that indicates that load process performance is on target or ahead of target (e.g., above the upper threshold 500). The indicator 516 can be employed for an aggregated metric that indicates that load process performance is significantly below target performance (e.g., below the lower threshold 504). The indicator 512 can be employed for an aggregated metric that indicates performance intermediate to the performance levels mentioned above (e.g., in between the thresholds 500 and 504).

In response to the control command sent at block 235, any receiving devices (e.g. the client devices 124, the indicator devices 144, or the like) are configured to render the relevant load process state indicator according to the control command. For example, the indicator devices 144 can be configured to emit light of the specified color and/or pattern, or any other suitable indicator signal, according to the control command. The client devices 124 can also render such indicators. In addition, the client devices 124 may render the aggregated metric 428 itself on displays thereof, in which case the aggregated metric 428 is the load process state indicator.

At block 240, the server 128 is configured to determine whether the load process is complete. The determination at block 240 can be based on the explicit receipt of data indicating completion, e.g. an input signal from the worker 116. In other examples, the determination at block 240 can be based on a detection that a door of the container 112 has been closed, on scheduling data indicating that the container 112 is to be withdrawn from the load bay 108 (regardless of fullness or other load process metrics), or the like.

When the determination at block 240 is affirmative, the server 128 stores the final aggregated load process metric, e.g., in the repository 166. Aggregated metrics for one or more previously completed load processes can therefore be retrieved from the repository 166, e.g., by a client device 124, for display to the supervisor 132 or the like to assist in planning for future load processes.

Figure 6:
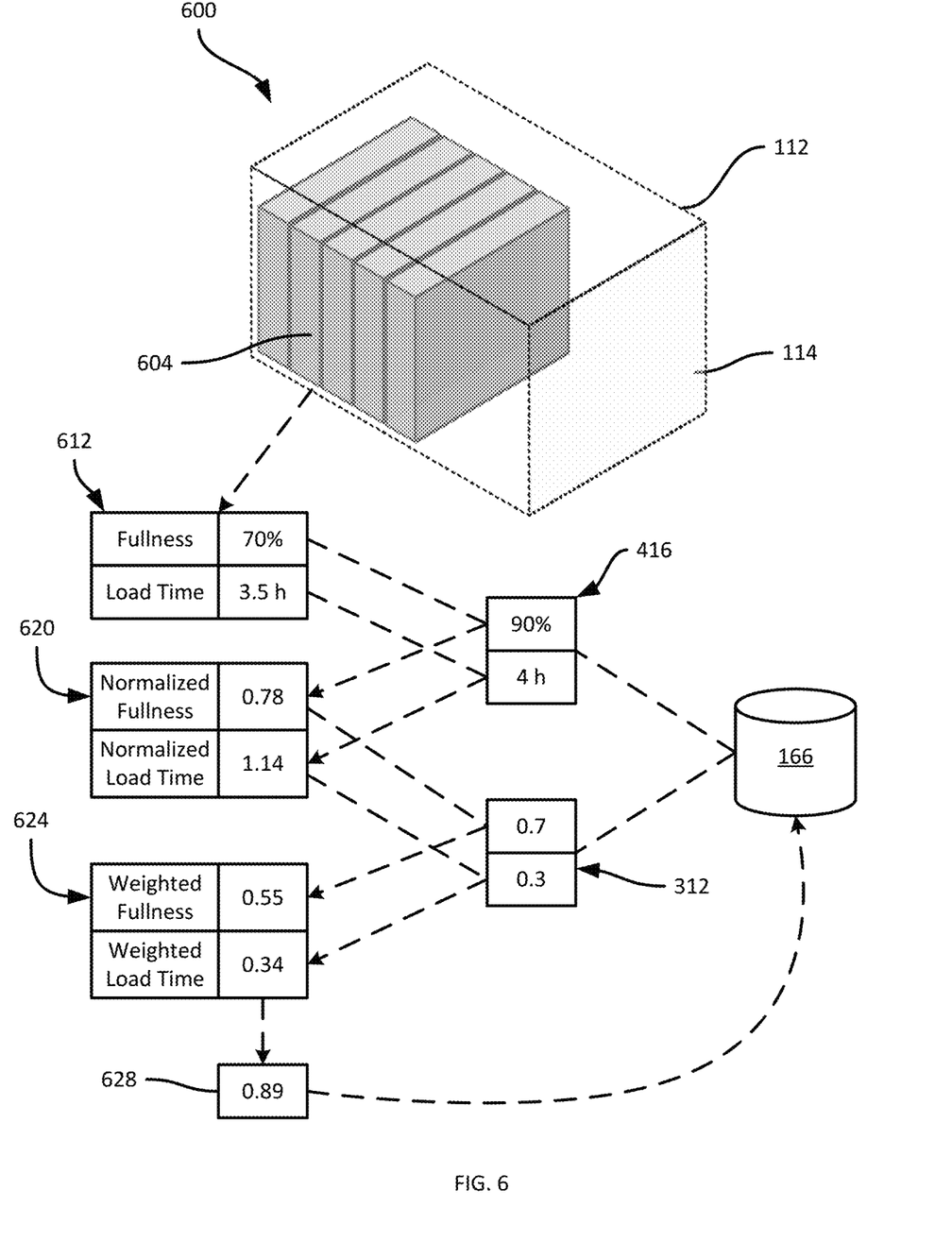
FIG. 6 is a diagram illustrating another example performance of blocks 215 to 230 of the method of FIG. 2.

When the determination at block 240 is negative, the server 128 returns to block 210, to continue collecting and processing sensor data as described above. For example, referring to FIG. 6, example sensor data 600 is illustrated, indicating a larger set 604 of items 120 in the container 112 than shown in FIG. 4. Based on the sensor data 600, the server 128 may determine (at block 220) load process metrics 612 including a current load time of 3.5 hours, and a current fullness of 70%. Via the same process described in connection with FIG. 4, the server 128 is therefore configured to determine normalized metrics 620, weighted metrics 624, and an updated aggregated load process metric 628. As will now be apparent, despite the container fullness derived from the sensor data 600 being greater than as shown in FIG. 4, the gap between the current fullness and target fullness, combined with the relatively small period of time remaining until the target load time is reached, leads to a decrease in the aggregated load process metric. As a result, the server 128 may generate and send a further control command at block 235, e.g. instructing the relevant indicator device 144 to generate the visual indicator 512 instead of the visual indicator 508.

In other examples, the server 128 can apply boundary conditions to the aggregated load process metric. For example, the interface 300 can also accept input data defining a maximum allowable load time, e.g. expressed as a percentage of the target load time for the load process. In such examples, the server 128 can generate the aggregated metric by comparing the relevant load process metric (e.g. load time) to the boundary condition. If the boundary condition is satisfied, e.g., if the maximum allowable load time has been exceeded, then generation of the aggregated metric can bypass block 225, and the aggregated metric can be set to a predefined value (e.g. zero).

Figure 7:
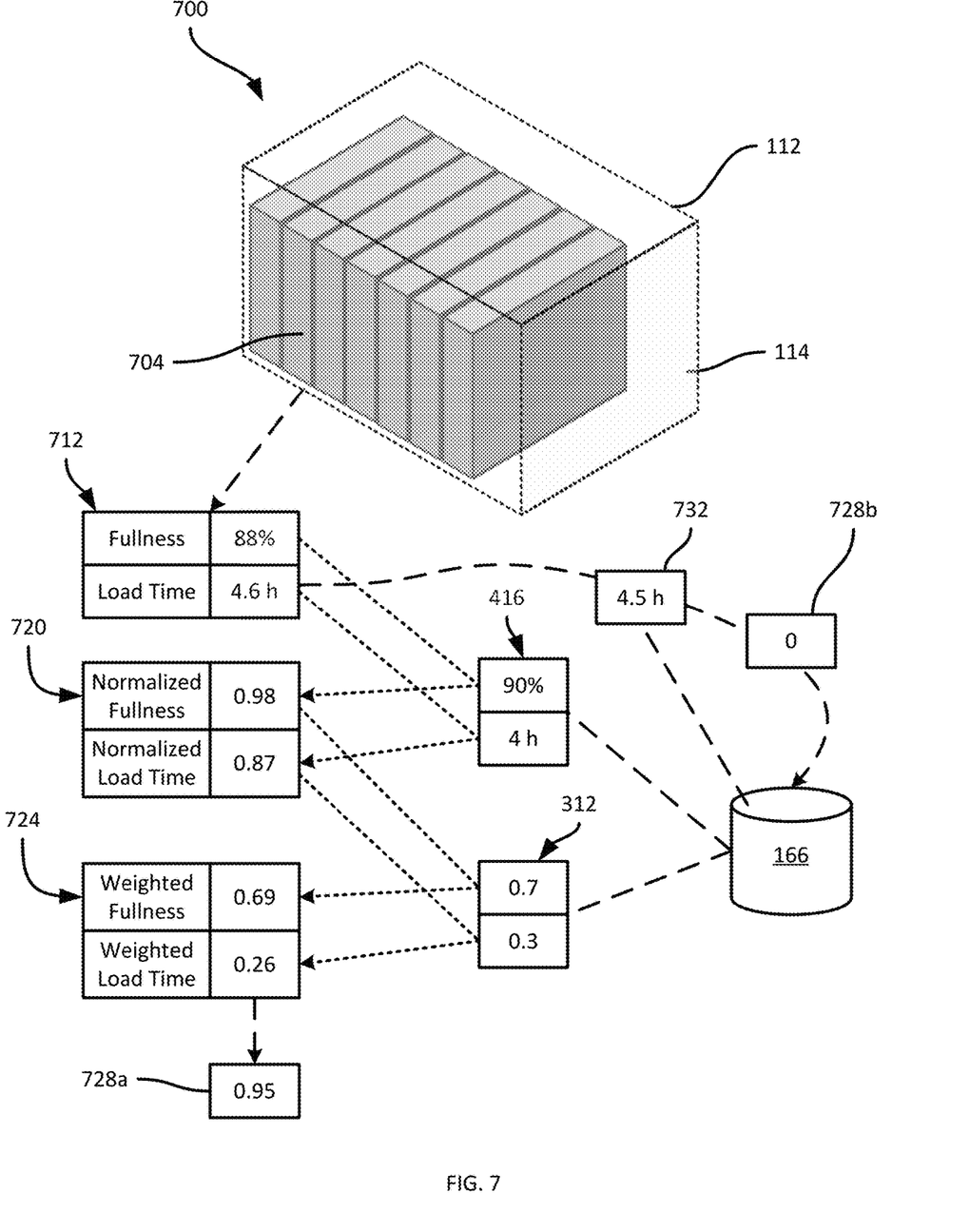
FIG. 7 is a diagram illustrating a further example performance of blocks 215 to 230 of the method of FIG. 2.

For example, referring to FIG. 7, further sensor data 700 is shown, from which load process metrics 712 are derived indicating that at a load time of 4.6 hours, the fullness of the container 112 is 88%. Although the generation of normalized metrics 720 and weighed metrics 724 would result in an aggregated metric 729a of 0.95, indicating on-target or ahead-of-target performance, the server 128 is configured, prior to generating the normalized metrics 720, to compare the current load time to a boundary threshold 732. Because the boundary threshold 732 is 4.5 hours, the current load time exceeds the boundary threshold, and the server 128 therefore bypasses block 225 and sets an aggregated metric 728b to zero.

The above description refers to a block diagram of the accompanying drawings. Alternative implementations of the example represented by the block diagram includes one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A method for load performance metric aggregation, comprising:
 (a) during a load process for a container at a load bay, controlling a sensor assembly disposed at the load bay to capture sensor data depicting an interior of the container;
 (b) at a computing device communicatively coupled to the sensor assembly:
  detecting, from the sensor data, a plurality of items placed in the container interior;
  determining, based on the detected plurality of items, a first load process metric associated with a first target, and a second load process metric associated with a second target;
  generating a first normalized metric based on the first load process metric and the first target, and a second normalized metric based on the second load process metric and the second target;
  obtaining a first weighting factor associated with the first load process metric, and a second weighting factor associated with the second load process metric;
  combining (i) the first normalized metric and the first weighting factor, with (ii) the second normalized metric and the second weighting factor, to generate an aggregated load process metric; and
  transmitting a control command according to the aggregated load process metric; and
 (c) rendering, at an indicator device associated with the load bay, a load process state indicator according to the control command,
 wherein generating the aggregated load process metric further includes:
  determining whether at least one of the first load process metric and the second load process metric satisfy a boundary condition; and
  when the determination is affirmative, setting the aggregated load process metric to a predefined value.

2. The method of claim 1, wherein transmitting the control command includes:
 comparing the aggregated load process metric to a threshold; and
 selecting the load process state indicator based on the comparison.

3. The method of claim 1, wherein transmitting the control command includes:
   comparing the aggregated load process metric to a set of thresholds; and
   selecting one of a corresponding set of load process state indicators based on the comparison.

4. The method of claim 3, wherein the set of thresholds define respective performance levels; and wherein the load process state indicators include visual indicators corresponding to the performance levels.

5. The method of claim 1, further comprising:
   prior to controlling the sensor assembly, receiving input data defining the first weighting factor and the second weighting factor;
   storing the first weighting factor and the second weighting factor in a repository accessible by the computing device;
   wherein obtaining the first and second weighting factors includes retrieving the first and second weighting factors from the repository.

6. The method of claim 1, further comprising:
   at the computing device, repeating the detecting, the determining, the generating, the combining, and the transmitting periodically during the load process.

7. The method of claim 6, further comprising: in response to detecting completion of the load process, storing a final aggregated load process metric at the computing device.

8. The method of claim 1, wherein the combining to generate the aggregated load process metric includes:
   generating a weighted first normalized metric;
   generating a weighted second normalized metric; and
   adding the weighted first normalized metric and the weighted second normalized metric.

9. A computing device for load performance metric aggregation, comprising:
   a communications interface communicatively coupling the computing device with an indicator device; and
   a processor configured to:
      during a load process for a container at a load bay, control a sensor assembly disposed at the load bay to capture sensor data depicting an interior of the container;
      detect, based on the sensor data, a plurality of items placed in the container interior;
      determine, based on the detected plurality of items, a first load process metric associated with a first target, and a second load process metric associated with a second target;
      generate a first normalized metric based on the first load process metric and the first target, and a second normalized metric based on the second load process metric and the second target;
      obtain a first weighting factor associated with the first load process metric, and a second weighting factor associated with the second load process metric;
      combine (i) the first normalized metric and the first weighting factor, with (ii) the second normalized metric and the second weighting factor, to generate an aggregated load process metric; and
      transmit a control command according to the aggregated load process metric,
   wherein the processor is configured, to generate the aggregated load process metric, to:
      determine whether at least one of the first load process metric and the second load process metric satisfy a boundary condition; and
      when the determination is affirmative, set the aggregated load process metric to a predefined value.

10. The computing device of claim 9, wherein the processor is configured, to transmit the control command, to:
   compare the aggregated load process metric to a threshold; and
   select the load process state indicator based on the comparison.

11. The computing device of claim 9, wherein the processor is configured, to transmit the control command, to:
   compare the aggregated load process metric to a set of thresholds; and
   select one of a corresponding set of load process state indicators based on the comparison.

12. The computing device of claim 11, wherein the set of thresholds define respective performance levels; and wherein the load process state indicators include visual indicators corresponding to the performance levels.

13. The computing device of claim 9, wherein the processor is further configured to:
   prior to controlling the sensor assembly, receive input data defining the first weighting factor and the second weighting factor;
   store the first weighting factor and the second weighting factor in a repository accessible by the computing device; and
   obtain the first and second weighting factors by retrieving the first and second weighting factors from the repository.

14. The computing device of claim 9, wherein the processor is further configured to:
   repeat the detection, the determination, the generation, the combination, and the transmission periodically during the load process.

15. The computing device of claim 14, wherein the processor is further configured to: in response to detecting completion of the load process, store a final aggregated load process metric.

16. The computing device of claim 9, wherein the processor is configured, to perform the combination, to:
   generate a weighted first normalized metric;
   generate a weighted second normalized metric; and
   add the weighted first normalized metric and the weighted second normalized metric.

17. A non-transitory computer readable medium storing instructions executable by a processor of a computing device to:
   during a load process for a container at a load bay, control a sensor assembly disposed at the load bay to capture sensor data depicting an interior of the container;
   detect, based on the sensor data, a plurality of items placed in the container interior;
   determine, based on the detected plurality of items, a first load process metric associated with a first target, and a second load process metric associated with a second target;
   generate a first normalized metric based on the first load process metric and the first target, and a second normalized metric based on the second load process metric and the second target obtain a first weighting factor associated with the first load process metric, and a second weighting factor associated with the second load process metric;
   combine (i) the first normalized metric and the first weighting factor, with (ii) the second normalized metric and the second weighting factor, to generate an aggregated load process metric; and transmit a control command according to the aggregated load process metric,
wherein the processor of the computing device is configured, to generate the aggregated load process metric, to:
determine whether at least one of the first load process metric and the second load process metric satisfy a boundary condition; and
when the determination is affirmative, set the aggregated load process metric to a predefined value.

* * * * *